May 13, 1930. J. E. THORNTON 1,758,185
CINEMATOGRAPH COLOR FILM AND METHOD OF MANUFACTURE
Filed March 31, 1927  3 Sheets-Sheet 1
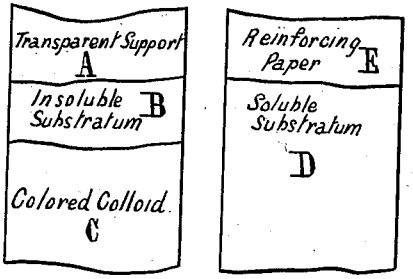
Fig. 1.
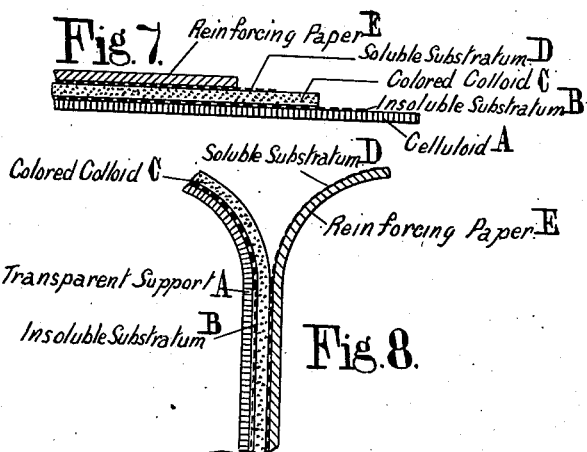
Fig. 7.
Fig. 8.
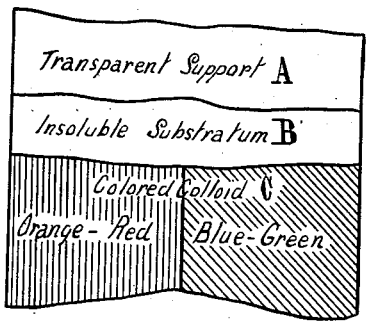
Fig. 3.
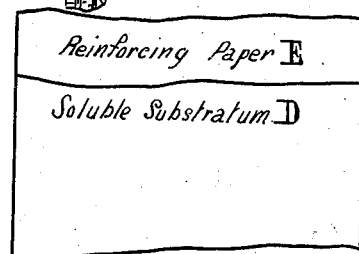
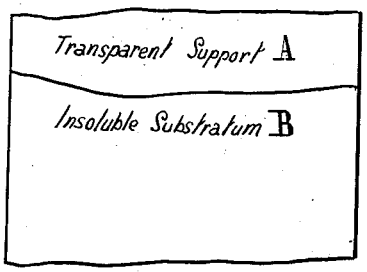
Fig. 4.
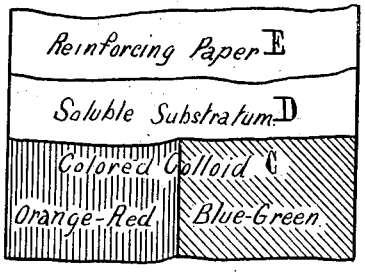
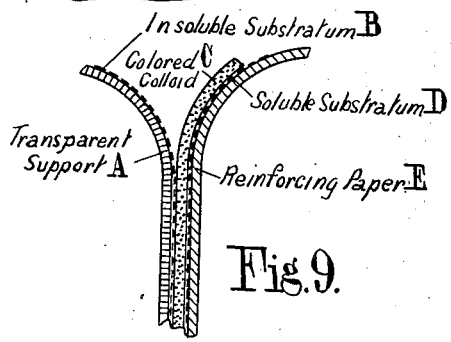
Fig. 9.
INVENTOR.
J. E. Thornton May 13, 1930. J. E. THORNTON 1,758,185
CINEMATOGRAPH COLOR FILM AND METHOD OF MANUFACTURE
Filed March 31, 1927 3 Sheets-Sheet 2

INVENTOR
J. E. Thornton

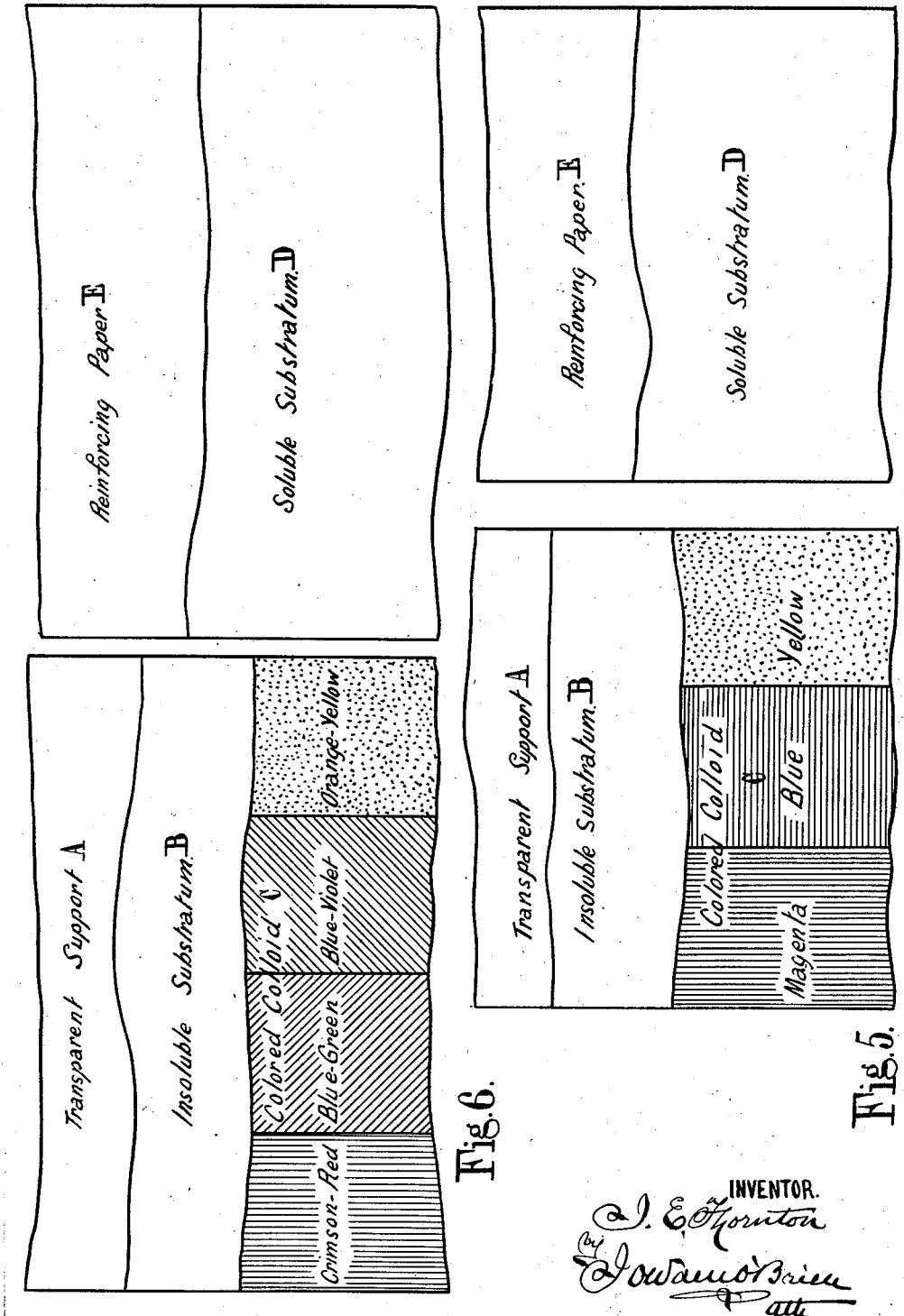

Patented May 13, 1930

1,758,185

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

CINEMATOGRAPH COLOR FILM AND METHOD OF MANUFACTURE

Application filed March 31, 1927, Serial No. 180,023, and in Great Britian May 6, 1926.

The object of this invention is to provide an improved form of ready-colored film-material of the sandwich type, and process for its manufacture, for use specifically in the production of relief-images by direct and purely photographic means upon a transparent support, either in one-color (monochrome), two-color, three-color, or four-color form; and it comprises improvements in the film-material and method of manufacture described in my Patents No. 1,610,827 and No. 1,635,516.

For the purpose of more readily distinguishing this from ordinary known types of film-material this particular type is termed "sandwich film", because it is built up from a number of layers comprising, in addition to two substratum layers of special type, three main component layers, viz; a transparent support, a ready-colored colloid sensitized layer, and a temporary reinforcing layer of paper; the colored colloid layer being sandwiched between the transparent support and the paper reinforcement.

The term film-material is not to be interpreted in a restricted sense but instead to cover and include sensitive material having a support of very thin flexible celluloid or the like, thick stiff celluloid, or rigid glass plate.

In producing transparent positive pictures by means of this new sandwich-film-material printing is effected through the back of the transparent support by light which passes first through a negative, then through the transparent support, and thence on to the colored sensitized layer which is therefore printed so that exposure extends from the back towards the front of the colored layer according to the varying density and tones of the negative.

After printing the material is developed by the particular method of treatment suited to the particular form of sensitizer used. The effect of the printing exposure and development (either one or both combined) is to produce an image of insoluble colored colloid which varies in thickness according to the varying tones of the negative. After development the print is treated with hot water or other suitable solvent of the colloid, and as this penetrates the porous paper, it loosens the paper so that it becomes entirely detached and is discarded and at the same time gradually dissolves all the unprinted and still soluble colored colloid and washes it away, leaving a film or plate comprising only a transparent support, an insoluble adhesive substratum, and a relief-image or images of colored colloid indirectly but indissolubly attached to the transparent support by an intermediate insoluble adhesive substratum.

By this means ready-colored transparencies of any size or shape can be directly produced upon suitable transparent supports by simple and direct photographic operations, instead of as hitherto having to be first produced upon another temporary support and subsequently transferred therefrom to the permanent transparent support; and also such relief-images when produced are ready-colored without need for any subsequent dyeing processes. The result of the invention is that transparencies of even and perfect coloring can be produced in a very simple and inexpensive manner by means of this film-material, of simple construction.

Among the many kinds of photographs which can be produced by this invention may be included the following forms of positive-transparencies in either monochrome or multi-color:—cinematograph films, non-cinematograph continuous film-strips, lantern-slides, window transparencies, transfers for applying to paper, glass or any other kind of support.

The support itself is therefore varied according to requirements and may comprise thick glass plates, thick stiff rigid films, cinematograph film base, thin rollable films, or extremely tenuous films for transfers.

The film-material can be made in different forms for producing different kinds of positive transparencies, including the following:—

Varieties for multi-color pictures

Strips of cinematograph film-material, double-width for two-colors, triple-width for three-colors, and quadruple-width for four colors. These strips are subsequently divided as required into single strips.

Miscellaneous sizes and shapes of film-material for ordinary (non-cinematograph) pictures. These are made in double, triple, or quadruple adjacent areas in a sheet to be cut up as required by the user.

*Varieties for monochrome pictures*

Cinematograph single-width strips without cover.

Miscellaneous sizes and shapes, single-area without cover.

Cinematograph double-width strips (one half-width being sensitized for printing and the other half unsensitized to be used as a cover).

Miscellaneous sizes and shapes, double-area (one area being sensitized for printing and the other unsensitized to be used as a cover).

*Form and manufacture of the sandwich-material*

As the largest scope for the invention is in the production of cinematograph films, the following description of it is given as applied to that particular purpose and the accompanying drawings also illustrate as applied thereto, but it will be understood that when it is applied in the production of photographs of other forms, such as lantern slides, window transparencies, and many similar uses, the form and construction of the film-material is the same. But in such cases the material used for the transparent support itself may be either extremely tenuous film for transfer purposes, thin flexible film, stiff thick sheets of film, or rigid glass plates.

Fig. 1 is a plan view of single-width film for monochrome.

Fig. 3 is a plan view of double-width film for two-color.

Fig. 4 is a plan view of modified form of double-width film for two-color. This form is also applicable to monochrome, three-color and four-color films.

Fig. 5 is a plan view of triple-width film for three-color.

Fig. 6 is a plan view of quadruple-width film for four-color.

Fig. 7 is a section through any of the films shown in Figs. 1 to 6.

Fig. 8 is a section of any of the films shown in Figs. 1, 2, 3, 5 or 6 showing the two parts being assembled together.

Fig. 9 is a section through the form of film shown in Fig. 4 showing the two parts being assembled together.

Figures 11, 12:
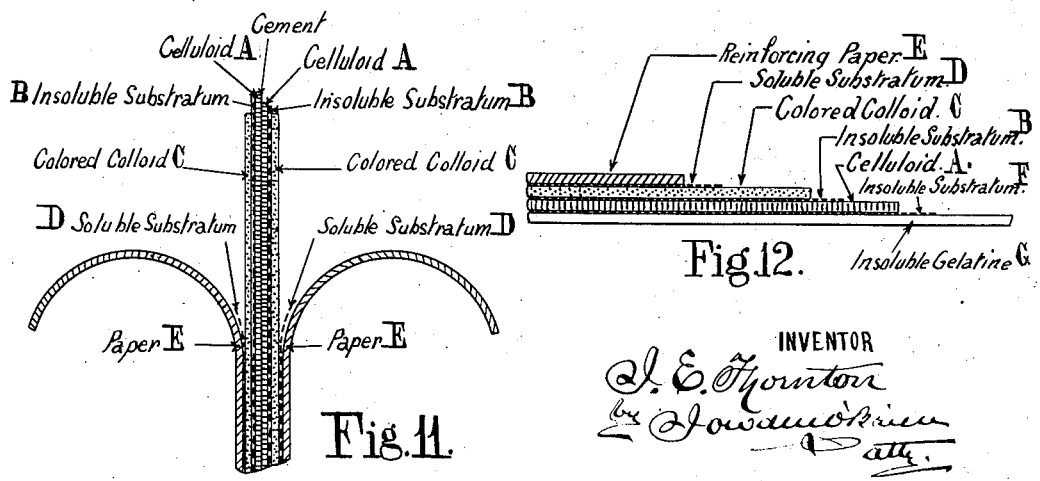

Fig. 11. is a section view of a double-width film cemented together face-to-face with the temporary paper reinforcement and the soluble substratum being removed.

Fig. 12 is a sectional view of a modified construction of film in which a layer of insoluble gelatine is permanently attached to the transparent support by an intermediate layer of insoluble substratum.

The film-material in its complete state comprises a thin support A of celluloid or other transparent waterproof material; upon which is superimposed a layer B of adhesive but non-soluble substratum; and upon this a layer C of colored colloid sensitized with silver salts for rapid printing, or with bichromate salts for slow printing; upon this another adhesive but soluble substratum D; and finally upon the second substratum a temporary reinforcing backing of paper E.

The foregoing represents the order of the respective layers in the finished reinforced film-material. They are, however, not laid down in that order in the process of manufacture because the different expansions and contractions would result in a most unsatisfactory product.

To overcome such difficulty the film-material is therefore formed in two parts see Figs. 1 to 5, which, after drying and contracting each to its own natural degree, are subsequently brought together and united to produce the complete film-material. The point of division may be varied in two ways as follows:—

In the preferred form the film-material Figs. 1, 2, 3, 5, 6, 7 and 8, comprises in one part the celluloid support A, insoluble adhesive substratum B, and colored colloid layer C, each laid down in that order, and in the other part the paper backing E and soluble adhesive substratum D. To unite these two parts (after they have been dried and shrunk) the surface of the colored colloid C, or of the soluble substratum D on the paper E, or of both, are very slightly but uniformly damped by any suitable means (preferably by passing through a moisture-charged chamber of damp air or steam), and then brought into face contact with each other, passed between pressure rollers, and finally into a drying chamber through which a current of warmed dust-filtered air is passed from the usual pressure fans and air-filtering plant.

In the alternative form (Figs. 4 and 9) the film-material comprises in one part the celluloid support A and insoluble adhesive substratum B, and in the other part the paper backing E, soluble adhesive substratum D, and the colored colloid layer C each laid down in that order. The two parts are united in the manner already described.

Figure 2:
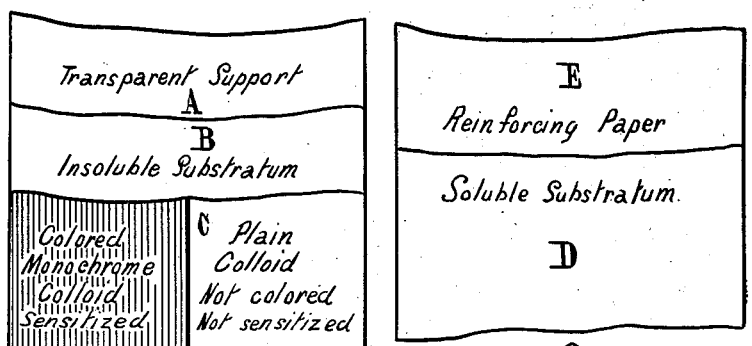
Fig. 2 is a plan view of double-width film for monochrome one half being colored and the other half transparent.
Figure 10:
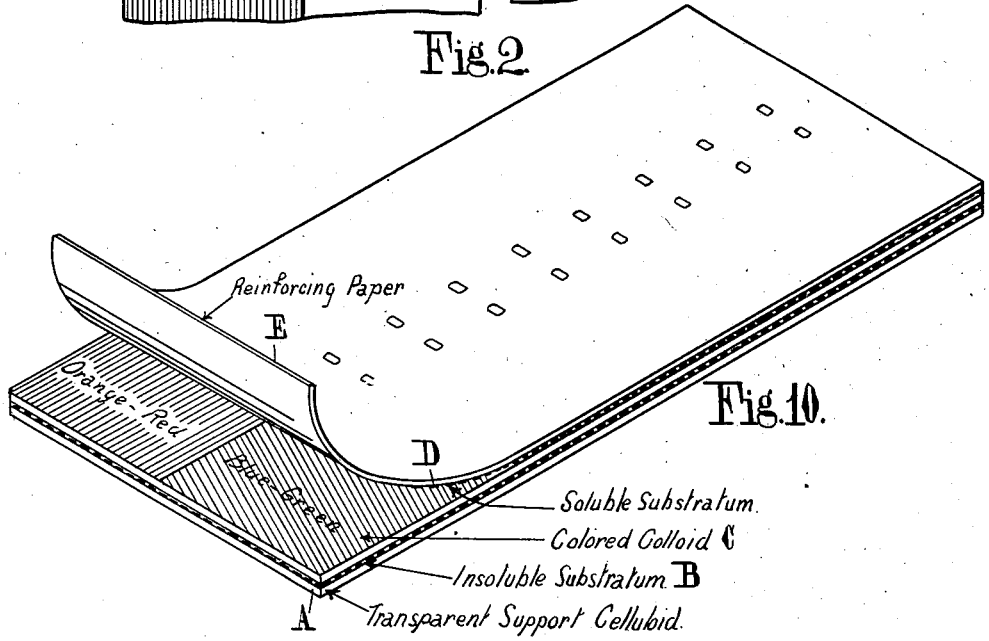
Fig. 10 is a perspective view of a two-color double-width film showing it provided with registration holes.

Figs. 10 and 11 show respectively a perspective view and section of a two-color double-width film with the reinforcing paper E being removed.

Two-color film-material

In carrying out the invention as applied to thin film-material for the production of two-color cinematograph films with ready-colored direct-relief-images by cementing two films together (one having orange-red coloring and the other blue-green) the material may be made in the form of two single strips of different colors, or one double width strip with parallel pair of colors, or as a wide web with a plurality of strips for subsequent slitting into single or double strips.

Three or four color film-material

For producing multi-color ready-colored direct-relief-image films of a greater number of colors, such as three or four, the method of manufacture is the same as for two-color, the only difference being the increased width of the multi-width strip or the increased numbers of single strips required and number and variations of colors.

Single color (monochrome) film-material of two-ply type

For producing two-ply monochrome ready-colored direct-relief-image films built up from a thin sensitized film and a similar thin (but non-sensitized) cover film, the methods of construction are the same. The only difference being that in a double-width material one half the width would be sensitized and ready-colored (for example, black or sepia or any other single color) and the other half would be plain colloid without coloring. If made as two separate strips the method of manufacture is the same. The reinforced backing is added as already described.

A film-material of this form is used for producing ready-colored monochrome direct-relief-image films, with scratchless images enclosed within the body of the film sandwiched between two transparent celluloid outer covers.

Single-color monochrome or colored film-material of single-ply type

For producing single-ply monochrome or colored film-material for ready-colored direct-relief-images the methods of manufacture are again the same, but the celluloid support is twice as thick as in the two-ply film-material. The reinforced backing is added as already described and the material can be made with any desired single color.

Varieties of coloring

The particular colors desired may be varied to suit the particular purpose for which the sandwich-material is required, but it may be useful to give the following description of color-groupings for the various applications of the material hereinbefore stated.

For one-color (monochrome) pictures, black, sepia, or any other single-color desired can be used.

For two-color pictures, orange-red and blue-green are the right combination. Or red and blue may be used instead provided that the two prints after developing are dyed with yellow to convert the red print into orange-red and the blue-print into blue-green.

For three-color pictures, magneta, blue and yellow form one much used combination; whilst red, violet and green are another sometimes used.

For four-color pictures, crimson-red, blue-green, blue-violet and orange-yellow form one good combination; whilst red, green, blue and yellow form another.

Thickness of component layers

The relative thicknesses of the various layers in the different forms of material described are approximately as follows but may be varied according to requirements:—

Temporary reinforcing paper layer $\frac{1}{1,000}$ to $\frac{2}{1,000}$ inch.

Soluble adhesive substratum layer $\frac{1}{10,000}$ inch.

Colored colloid sensitized layer $\frac{1}{1,000}$ inch.

Insoluble adhesive substratum layer $\frac{1}{10,000}$ inch.

Tenuous celluloid support for transfers $\frac{1}{2,000}$ to $\frac{1}{3,000}$ inch.

Thin celluloid support for multi-color films $\frac{2}{1,000}$ inch.

Thick stiff celluloid support for window transparencies $\frac{5}{1,000}$ to $\frac{10}{1,000}$ inch.

Rigid glass plates for lantern slides about $\frac{30}{1,000}$ inch.

Sensitizing with silver-salts for rapid printing

When the film-material for rapid printing is required it is sensitized with silver-salts made up into an emulsion with gelatine in the usual manner, the emulsion then being coated on to the adhesive substratum attached to the celluloid support. Such film-material is printed in any type of printing machine in the ordinary way, after which it is developed in any suitable developer, then treated in any of the known baths that will render the gelatine of the image insoluble in direct ratio to the amount of reduced silver contained therein, then treated with any known solvent or solvents to remove all the reduced silver and unreduced silver-salts. It is then dried. Finally the print is treated with hot water or other suitable solvent to dissolve and remove all the soft gelatine, leaving behind relief images of insoluble colored gelatine attached to the transparent celluloid support.

*Sensitizing with bichromate-salts for slow printing*

When a film-material for slow printing is required it is preferably sensitized with a bichromate salt, such as ammonium, potassium, or sodium bichromate. This can be combined with the gelatine or other colloid and then coated on to the substratum attached to the support. Or if preferred the plain colloid instead can be coated on to the support, and the strip sensitized at any future time immediately before printing by passing it through a solution of the bichromate salt until sufficient is absorbed by the colloid (passing first through the paper and substratum then into the colloid) after which it is again dried before use. This bichromate-sensitized material requires printing by a much stronger but cooler light than necessary for silver (for example a mercury-vapour lamp). Also its colored colloid is rendered insoluble where printed by the action of light alone, without the developing silver-dissolving, and insolublizing operations necessary for silver-printing. It is only necessary to discharge the yellow color of the insoluble colloid by a bleaching bath of bisulphite lye, after which the print is treated with hot water or other suitable solvent to dissolve and remove the soft colloid as in the previous method.

*Coloring the film-material.*

The coloring matter may be either pigments or dyes, or the two combined, which are mixed with the colloid in the first case. Or dyes alone may be used and these may be mixed with the colloid in the first case before coating, or they may be applied afterwards by running the coated film through suitable dye-baths until sufficient dye has been absorbed, or the dyes may be applied in parallel stripes by rollers or other suitable coating apparatus. The dyes are suitably mordanted to fix and prevent them from being washed out from the colloid during the subsequent developing operations. To keep the dyes of the parallel stripes from running into each other they are divided by narrow lines of non-absorbent colloid produced by applying a hardening solution as a narrow line.

*Printing and developing the film-material*

The film-material is designed exclusively for the production of direct-ready-colored images in relief by straightforward simple photographic processes, and is therefore intended to be printed from the back by light which passes first through the negative or printing cliché, then through the transparent support, and then on to the back of the colored colloid layer. Development takes place from the front, the developing and other solutions and finally the hot water or other solvent passing through the porous reinforcing paper layer to the colored colloid layer enclosed between the paper and the support. The final treatment with the hot water or other solvent, after penetrating the paper, first attacks and dissolves the second substratum of soft gelatine and then the soft portions of the colored gelatine or other colloid.

Therefore the paper is first loosened, then comes entirely off and is discarded, and finally the whole of the soluble colored colloid is gradually dissolved and washed away leaving behind only that portion of the colored colloid which has been rendered insoluble (and is left to constitute the image) indissolubly attached to the transparent support.

In developing some forms of the ready-colored sensitized material, particularly that used for two-ply cinematograph films, and the still thinner variety made for multi-image transfers, a convenient way is to cement the two films together back-to-back (celluloid-to-celluloid) with a suitable cellulose cement, immediatey after printing, and then to develop the printed multi-films as one strip, with the paper reinforcements on the two outer faces. When finished the result will be a film of two-ply celluloid with a series of relief images upon the two outer faces, the paper strips having become detached and been removed.

*The two auxiliary layers or substrata*

To ensure that the insoluble adhesive substratum (the one laid upon the transparent support) shall not dissolve under the hot water treatment and so allow the colored images to become detached from their support, the colloid of the substratum is rendered insoluble, for example, by the addition of a small proportion of chrome-alum. But it is preferred to use instead a small proportion of a bichromate salt, and after drying the bichromated substratum is then given a short exposure to light in order to render it insoluble, after which it is preferably washed (though this is not absolutely essential) to remove the remaining traces of bichromate before adding the colored colloid layer by coating it on to the substratum layer.

The soluble adhesive substratum (the one laid upon the reinforcing paper) is composed of soft gelatine only, which is not rendered insoluble.

The result is that the soluble substratum dissolves during the hot water treatment and allows the temporary reinforcement to separate and come entirely away, but the insoluble substratum does not dissolve but instead remains insoluble and continues to permanently hold the colloid layer to its transparent support.

Although the film-material herein described is intended chiefly for use in the production of relief-images it can equally well be used for the production of non-relief images. The film-material itself and the method of its use is the same, but the final treatment of the film after development is varied by washing away or bleaching out those portions of color which remain in the soft colloid, leaving the colloid also instead of dissolving it away. The color remaining will be that which is permanently locked up in the insolublized portions of the printed colloid.

When it is desired to produce a non-curling type of film a layer G of plain-gelatine suitably hardened and insolublized so that it will not dissolve in hot water may be attached to the face of the celluloid layer by an insoluble substratum F as shown in section in Fig. 12. A film with a similar layer of insoluble gelatine may also be employed when a cinematograph film is required having an outer gelatine layer. This insoluble gelatine layer and its insoluble substratum for securing it to the transparent support do not become detached when the paper layer is detached but are permanently retained upon the opposite side of the transparent support to the colored layer and its substratum.

What I claim as my invention and desire to protect by Letters Patent is:—

1. The method of manufacturing a strip of film material which consists in coating a strip of celluloid with a thin layer of insoluble bichromated gelatine applying thereto two stripes of sensitized colloid drying and shrinking the same, coating a strip of porous paper with a thin layer of soluble gelatine drying and shrinking the same, damping the face of the two strips and laying one strip on the other to amalgamate them into a single strip of film material.

2. A strip of film material comprising in its construction two separate and distinct component parts amalgamated together one component part comprising a base, an adhesive substratum and a sensitized colloid dried and shrunk thereon and the other component part comprising a base and an adhesive substratum dried and shrunk thereon the two component parts amalgamated together into a single strip of film material.

3. A strip of film material comprising in its construction two separate and distinct parts, one part comprising a transparent base, an insoluble substratum and a layer of coloured sensitized colloid, dried and shrunk thereon and the other part comprising a porous paper base and a layer of soluble gelatine dried and shrunk thereon the two parts being amalgamated together into a single strip of film material.

4. A strip of film material comprising in its construction two separate and distinct parts, one part comprising a strip of celluloid, a thin layer of insoluble bichromated gelatine and two stripes of sensitized colloid dried and shrunk thereon and the other part comprising a porous paper base and a layer of soluble gelatine dried and shrunk thereon the two parts amalgamated together into a single strip of film material.

In testimony whereof I have hereunto set my hand.

JOHN EDWARD THORNTON.